June 2, 1925. 1,540,276
W. G. NICHOLS
CHAIN BUCKET DREDGE
Filed Aug. 30, 1922 7 Sheets-Sheet 2
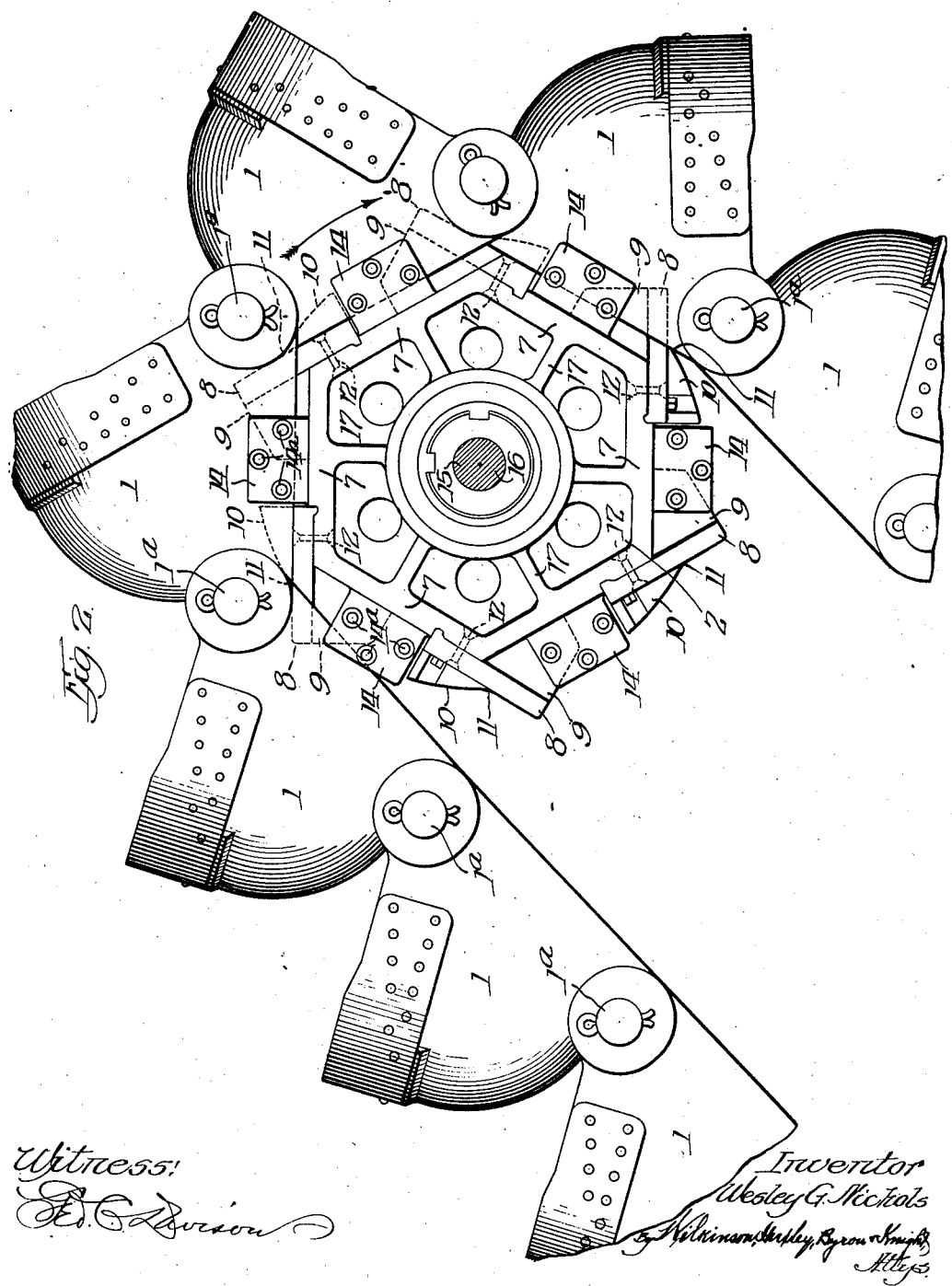

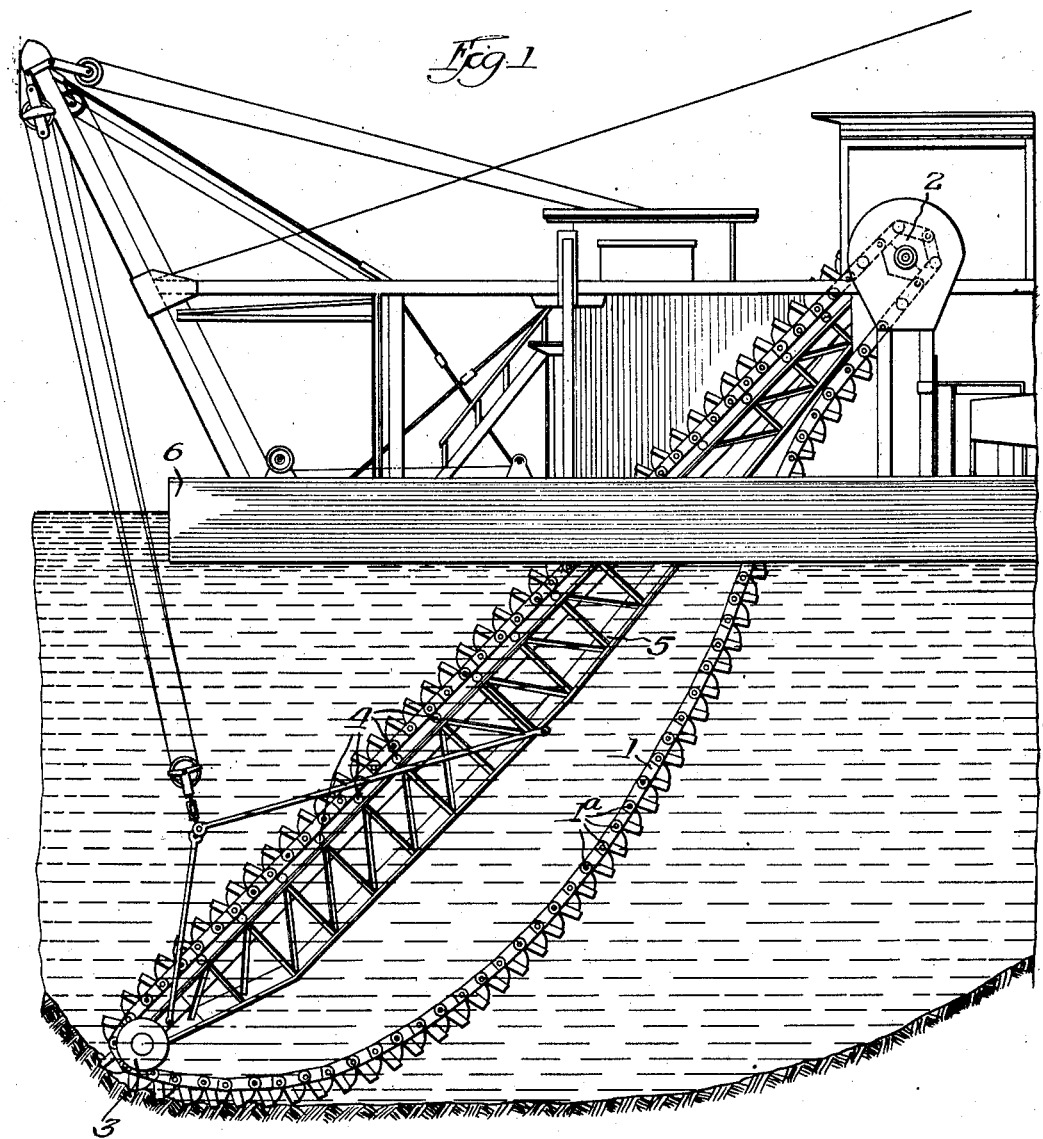

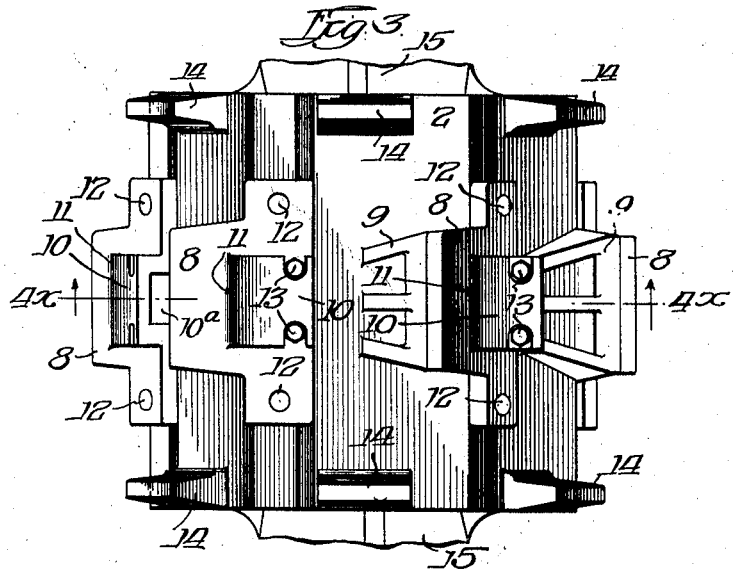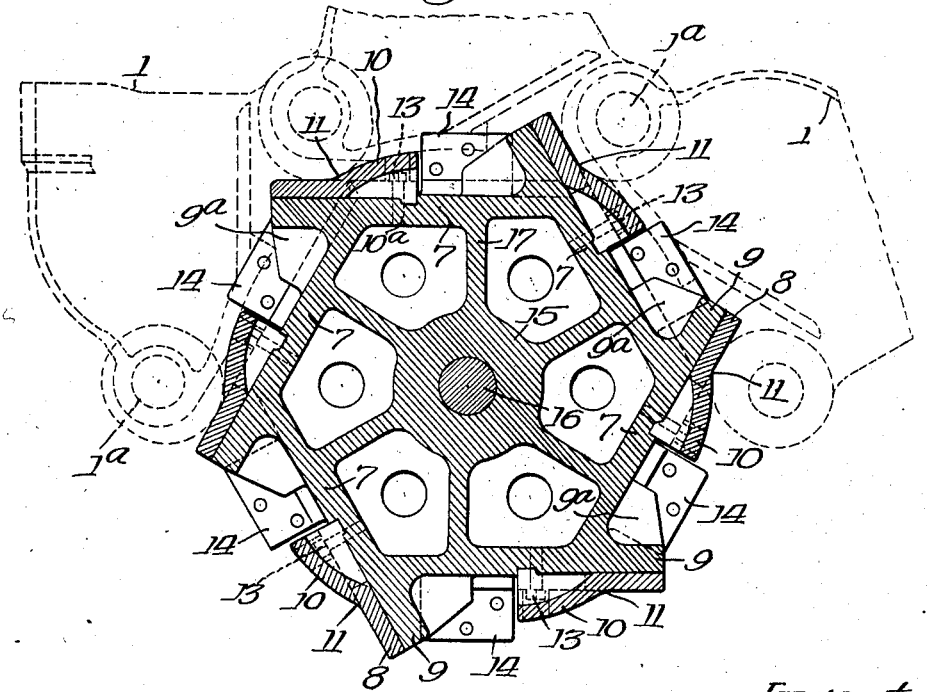

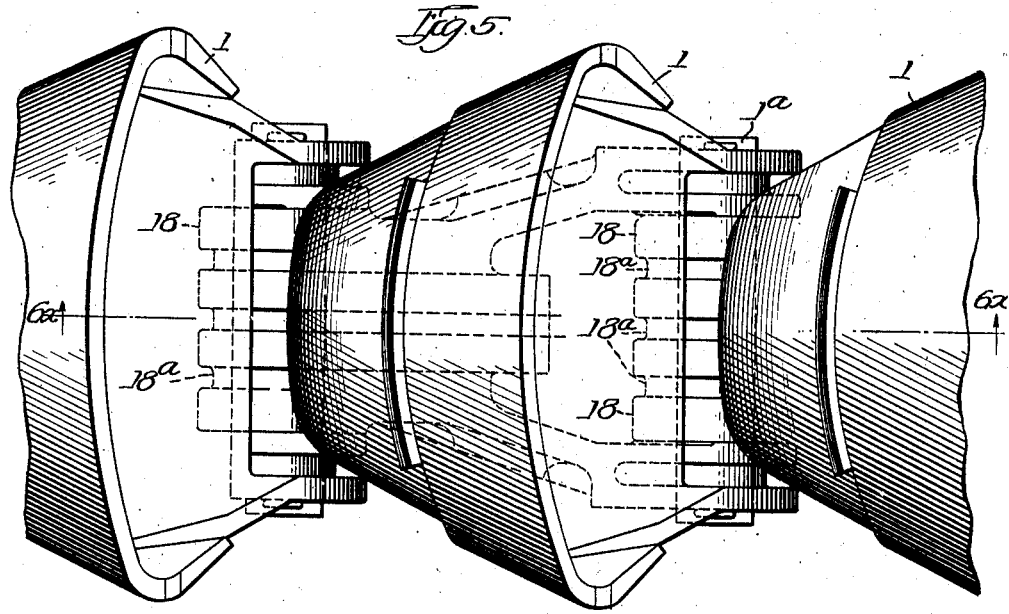
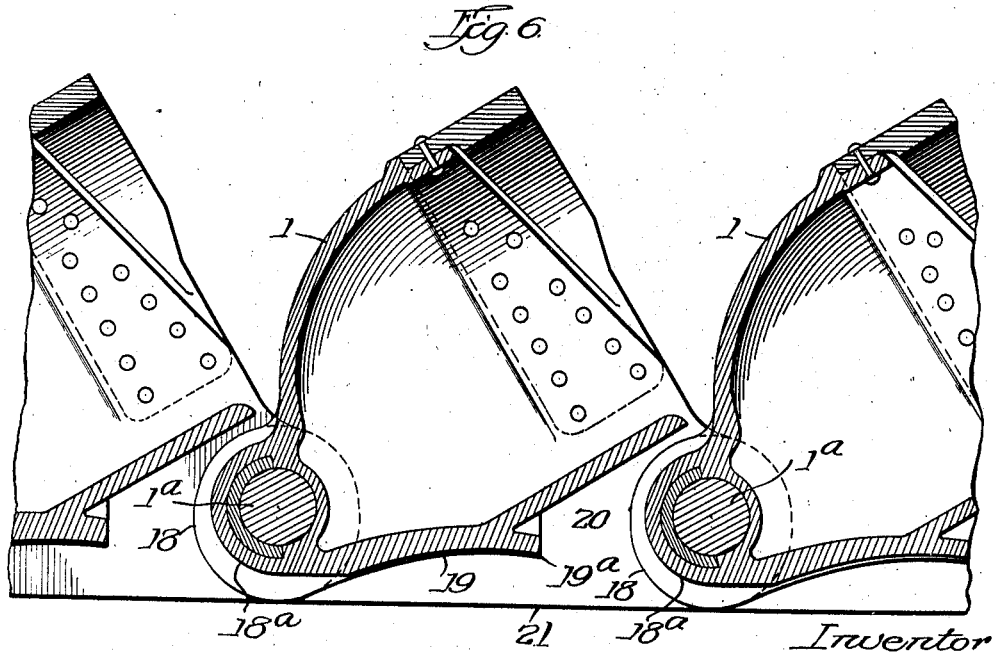

June 2, 1925.  1,540,276
W. G. NICHOLS
CHAIN BUCKET DREDGE
Filed Aug. 30, 1922   7 Sheets-Sheet 5
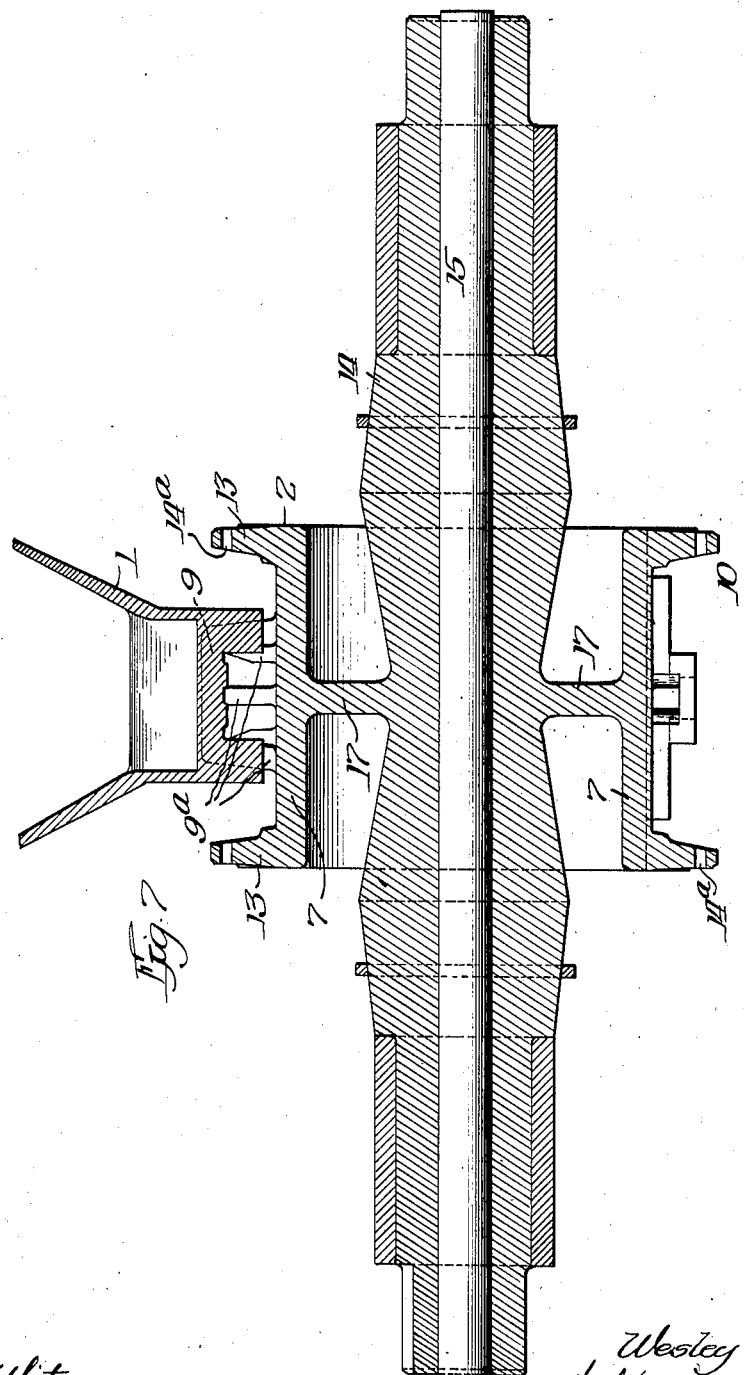

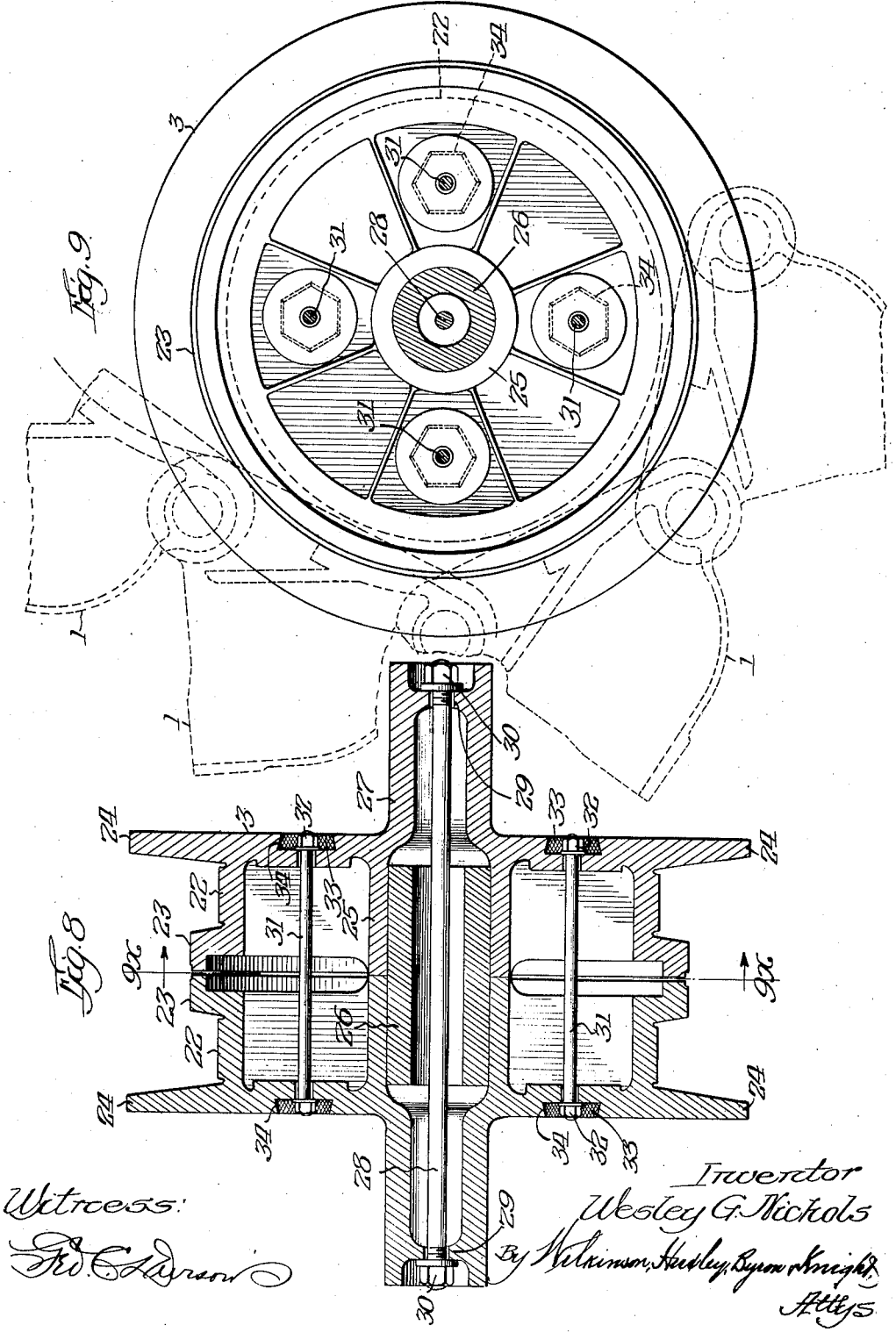

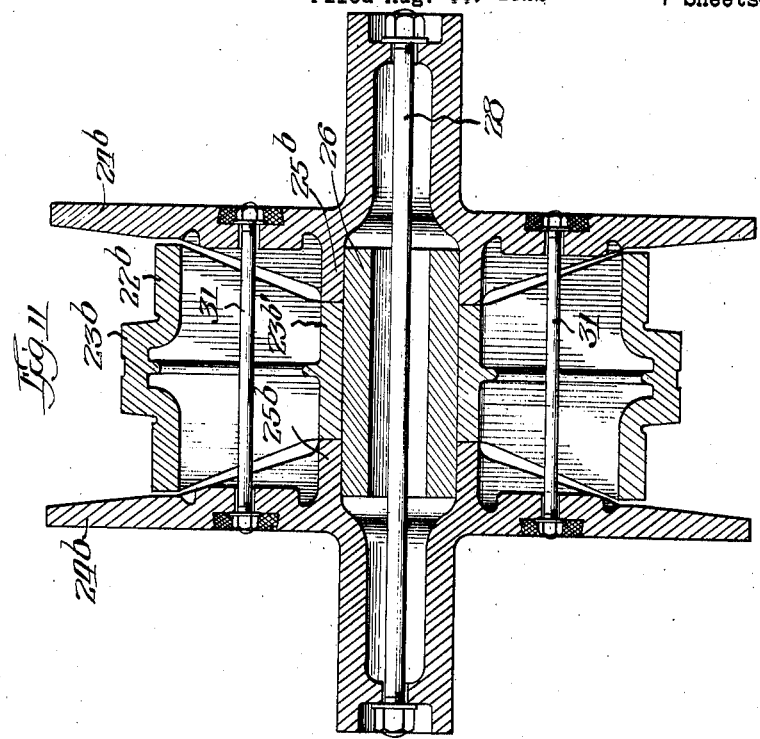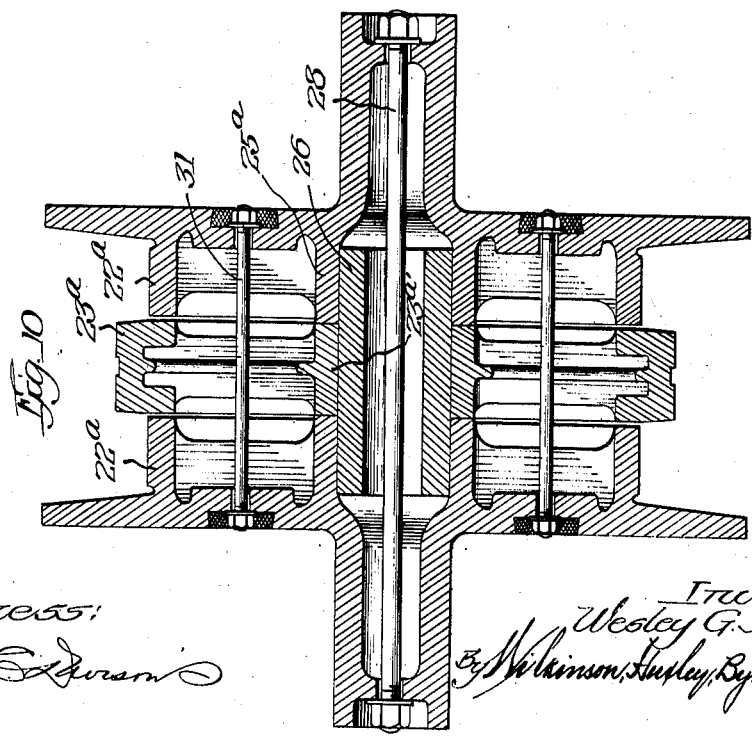

Patented June 2, 1925.

1,540,276

UNITED STATES PATENT OFFICE.

WESLEY G. NICHOLS, OF CHICAGO HEIGHTS, ILLINOIS, ASSIGNOR TO AMERICAN MANGANESE STEEL COMPANY, OF CHICAGO, ILLINOIS, A CORPORATION OF MAINE.

CHAIN BUCKET DREDGE.

Application filed August 30, 1922. Serial No. 585,192.

*To all whom it may concern:*

Be it known that I, WESLEY G. NICHOLS, a citizen of the United States, residing at Chicago Heights, in the county of Cook and State of Illinois, have invented certain new and useful Improvements in Chain Bucket Dredges, of which the following is a specification.

This invention relates to dredges in which excavating buckets connected in an endless chain are mounted to travel around driving and idling tumblers at the ends of the bridge, through means of which an excavating chain is presented against the material to be excavated, the intervening stretch of the ascending portion of the chain being supported by rollers located at intervals along the bridge.

Bucket chain excavators of this kind, especially as used in placer gold mining dredge operations, are necessarily made of large proportions and massive construction, and of material having very high resistance to erosion and shock, in order that they may stand up under the service required of them, and to meet these conditions it has been necessary to make the buckets of manganese steel castings having integral eyes at front and rear through which they are hinged together in building up the endless chain. For similar reasons the upper and lower tumblers have generally been constructed mainly or wholly of the same material, the upper tumbler in the form of a driver upon which the bucket chain grips in a manner to be propelled thereby in the driven revolution of the tumbler, and the lower tumbler in the form of an idler which merely guides the bucket chain and revolves under the driving action of the chain. But much difficulty has been experienced in obtaining a construction of bucket and upper and lower idlers that would withstand the enormous loads imposed upon these parts under working conditions. The practice was established of making the idler tumbler of polygonal form with faces corresponding in dimension to the length of the bucket links, but boulders or pieces of rock getting in between the faces of the tumbler and the buckets often caused breakage of the latter.

Experiments were also made with round tumblers at the lower end of the bridge, and while this served the purpose of preventing boulders or rock from lodging between the bucket and the tumbler, it greatly increased the tendency to breakage of the buckets, due mainly to the fact that the flat bottom buckets would contact each on a single transverse line of the cylindrical surface of the tumbler and cause one or another of the pivoting eyes of the buckets to pull out, with the result that the entire bucket had to be replaced and the cost of maintenance was very large. Again, with tumblers as heretofore constructed, the bucket chain would at times become displaced axially of the tumbler to an extent which caused breakage of the confining flanges, especially when the operator sought to swing the line to one side or the other and considerable side thrust was developed against the bucket chain. Furthermore, the construction of upper or driving tumbler has been found to be unsatisfactory because of excessive wear upon the driving surface and lack of means for centering the bucket chain upon it.

The present invention overcomes all of the several difficulties above enumerated, and provides a construction of lower or idler tumbler, upper or driving tumbler, and bucket cooperating with said tumblers, whereby continuous arcuate bearing of the buckets is insured upon a cylindrical surface of the lower tumbler in a manner to not only exclude destructive objects from between the surfaces of the buckets and tumbler but to avoid the strain of a straight surface bearing tangentially upon a cylindrical surface; and the bearing surface of the lower tumbler is provided by an axially restricted protruding portion of the tumbler in the form of a cylindrical boss or rib, which enters between confining walls on the underside of the buckets in a manner to resist axial displacement of the buckets upon the tumbler. The upper tumbler is made with a polygonal driving surface with its faces not only affording full bearing for the bucket links, but extending rearwardly beyond the pintle bearing of each bucket, and intersecting the line of drag imposed by the ensuing bucket so as to increase the driving effect; the driving surface thus produced being provided by an attached face plate that overlies the face of the idler and the driving spur thereof, and said bearing face being further provided, preferably through the medium of the facing plate, with a heel piece or fog that serves the combined purpose of entering a recess on the under side of the bucket forward of its rear pintle, and providing with the driving spur a saddle or crotch in which the hub of the bucket may rest, thereby not only confining the bucket against lateral displacement in the direction of the axis of the tumbler, but preventing it from slipping in the direction of the drive. Finally, the buckets are constructed at their sides with longitudinally straight under edges or runners which adapt them to travel over the rollers located upon the bridge intermediately of the tumblers, and with recesses between said runners; a portion of the recess in each bucket corresponding to the heel piece or frog on the driving tumbler and to the cylindrical guiding and supporting rib on the idler tumbler, and the remainder of said recess, immediately in rear of the forward pintle or hub being proportioned to accommodate the rearwardly projecting driving spur from the next preceding tumbler face.

In order that the invention may be fully understood, the preferred embodiment thereof, as well as some modified constructions of some of its features, will now be described in detail with reference to the accompanying drawings.

In said drawings—

Figure 1 is a view of a placer mining dredge showing the relation between the endless chain of buckets and the upper and lower tumblers and intermediate rollers upon the bridge.

Figure 2 is a detail view showing the upper or driving tumbler in side elevation together with a portion of the bucket chain which travels upon the same.

Figures 3 and 4 are, respectively, a plan view and a vertical transverse section of the upper or driving tumbler, the relation of the buckets being shown in dotted lines in the latter view.

Figures 5 and 6 are, respectively, a top plan view and a vertical longitudinal section through a plurality of connected buckets, the section of Figure 6 being indicated by the line 6ˣ—6ˣ in Figure 5.

Figure 7 is an axial section of the driving tumbler and of a portion of a bucket that cooperates therewith.

Figures 8 and 9 are, respectively, an axial section and a vertical transverse section of the lower or idler tumbler, the section of Figure 9 being indicated by the line 9ˣ—9ˣ in Figure 8.

Figures 10 and 11 are sections corresponding to Figure 8 showing two modified constructions of the lower or idler tumbler.

Referring to Figure 1, 1 represents buckets connected by pintles 1ª in an endless chain, and mounted to travel around an upper or driving tumbler 2 and a lower or idler tumbler 3, and over intervening supporting rollers 4 of a bridge 5. Bridge 5 is, in practice, usually mounted upon a floating vehicle or scow 6. The present invention relates to the particular construction of the upper tumbler 2 and the lower tumbler 3, and of the buckets 1, which are adapted to cooperate in a special manner with the said tumblers, and at the same time preserve their side walls with substantially straight under edges or runners that adapt them to traverse a series of rollers 4.

As shown in Figures 2 to 7, the upper tumbler is constructed with a polygonal rim composed of sides 7, each of which is of a dimension which adapts it to receive, support, confine, and enter into driving relation with an individual bucket by the construction of its face. Each side 7 is constructed with a rearwardly extending driving spur built up from a wearing plate 8 and the supporting bracket 9, and this driving spur extends sufficiently beyond the pintle hub of the bucket to intersect the line of drag from the next ensuing bucket, and thereby enter into effective driving relation to the bucket. Each side 7 is further provided, preferably through the medium of its facing plate 8, with a heel or frog 10 that lies immediately forward of the portion of the spur which receives the pintle hub of the bucket, and serves the dual purpose of entering a recess in the underside of the bucket to confine the bucket against lateral displacement in the direction of the axis of the tumbler and to form with the spur 8 a saddle or crotch 11 in which the pintle hub rests, thereby confining the bucket against displacement upon the tumbler in the direction of its travel. As will appear from the ensuing description, the outer surface of the frog 10 and the corresponding surface of the recess in the bucket 1 are made to conform one to the other and are constructed upon an arc which adapts the recess to fit the periphery of the central boss or rib of the lower or idler tumbler; also the portion of the recess on the under side of a bucket which lies forward to that which receives the frog 10 is adapted to receive the driving spur 8 and its supporting bracket 9, when the latter assume extreme angular relation to the bucket, such, for instance, as illustrated in the right hand portion of Figure 2. Facing plates 8, which form the driving spurs, are replaceably secured through means of bolts or rivets 12, and the frogs or heel pieces 10 through the medium of screws 13. In this manner, these parts which receive the greatest wear are made replaceable, and the life of a tumbler will be thereby greatly prolonged with minimum expense. 14 represent marginal confining lugs on the upper tumbler 12 which safeguard the bucket chain in case of impairment of a confining frog 10. The upper tumbler is preferably constructed with a hub 15 shrunk upon a strengthening core 16, and with radial spokes 17 that support the sides 7.

In order that the parts may be properly heat treated when made of cast manganese steel, confining lugs 14 will preferably be constructed with openings 14$^a$, as shown in Figures 2 and 7, and the brackets 9 of the driving spurs 8 are hollow beneath and constructed with strengthening ribs 9$^a$, as shown in Figures 3 and 4, while the heel pieces or centering frogs 10 are also made hollow, as shown in said figures.

As shown in Figures 5 and 6, the buckets 1 are provided with hubs 18 to receive their pintles 1$^a$, and these hubs are constructed with circumferential grooves 18$^a$ that reduce the section of metal in certain areas and open up the interior thereof to proper heat treatment, as taught more fully in a prior application; but these hubs are left with sufficient bearing surface to adapt them to traverse the supporting periphery of the lower or idler tumbler. Forward of the hub 18, and extending therefrom on an arc corresponding substantially to the circumference of the idler tumbler and to the outer surface of the centering and supporting frog 10, is a bearing surface 19 extending to the point 19$^a$, beyond which is a deeper recess 20 to accommodate the driving spur 8 and its supporting bracket 9. A continuation of the arc of the under supporting surface 19 coincides with the under side of the hub of the preceding bucket, and when a plurality of buckets are in position upon either tumbler, the arcuate bearing surfaces of said buckets lie in the same circumference. On either side, the side walls of the buckets 1 extend substantially straight from hub to hub, so that the buckets are better adapted to traverse the rollers 4 mounted upon the bridge 5 intermediate of the tumblers 2 and 3, as shown in Figure 1; and these walls, extending inward beyond the arcuate supporting surfaces 19, embrace the sides of the boss of the idler roll and of the centering frog or heel piece 10 in effecting the lateral confinement of the buckets, as hereinbefore referred to.

The construction of the preferred form of idler or lower tumbler 3 is best shown in Figures 8 and 9. This consists of two cylindrical halves 22, 22, each constructed with an inner raised boss or rib portion 23, which, when fitted together, provide the radially protruding cylindrical bearing member that receives the arcuate surfaces 19 upon its periphery and the runners 21 upon its sides; also preferably outer confining flanges 24 which act to curb the bucket chain in case of emergency, although normally saved from impingement by engagement of the bucket upon the central boss 23; also hub portions 25 of hollow cylindrical form which are shrunk upon a central core 26 preferably of different metal; and also the trunnions or journals 27 extending integrally from the hub portions 25 beyond the sides of the tumbler, and by which the tumbler is supported in its bearings. The members of the idler tumbler are drawn together axially by means of a tie rod 28 which passes axially through them and is seated upon internal flanges 29 through the medium of nuts 30. The halves thus secured are drawn together not merely by tension developed by screwing the nuts upon the ends of the tie rods, but by inherent tension in the tie rod developed by heating it to a high temperature and introducing it and screwing up the nuts while it is very hot. In addition to the tie rod 28, the halves 22 of the idler tumbler may be united by means of a circumferential series of rods 31 located at radial distances intermediate of the center and periphery; and these tie rods, maintained under tension by nuts 32 as well as by contracting from the high temperature developed at the time of introduction, if desired, are secured against loosening by means of fillings 33 of babbitt or similar material cast into recesses 34 in the faces of the tumbler halves. By constructing the idler tumbler as above described, not only is it adapted to function as heretofore described in its cooperation with the bucket chain, but it is peculiarly adapted for production mainly from cast manganese steel, inasmuch as its hollow section facilitates necessary heat treatment.

As shown in Figures 10 and 11, the intermediate boss or rib may be provided on the idler tumbler otherwise than by forming it in two halves, respectively integral with halves of the tumbler. These may be formed of a separate piece shrunk upon the core member 25 intermediately of the two hub portions. Thus, according to Figure 10, an intermediate rib member 23$^a$ is wholly independent of the two tumbler members 22$^a$ and carries a hub portion 23$^{a'}$ which is shrunk upon the core 26 between the hub members 25$^a$, which are drawn together by tie rods 28 and 31 as described in connection with Figures 8 and 9. Or the intermediate boss or rib may take the form shown at 23$^b$ in Figure 11, which has the rim portions 22$^b$ integral therewith and supported from the intermediate hub section 23$^{b'}$ upon the core member 26, while the flange members 24ᵇ alone are carried by the hub sections 25ᵇ. Here, also, the parts are drawn together by the same tie rods 28 and 31 as described in connection with Figures 8 and 9.

The forms disclosed in Figures 10 and 11, like the form disclosed in Figures 8 and 9, are peculiarly well adapted for production by the process of casting from manganese steel, followed by heat treatment or annealing.

I claim:

1. A bucket for bucket chain dredges, constructed with a pintle hub and a concaved bearing surface forward of and merging into the surface of said pintle hub.

2. In bucket chain dredges, buckets connected together by front and rear pintle hubs, and having in a bucket forward of the rear hub, a concaved tumbler-receiving surface merging into the surface of said rear hub, and confining walls at either side of said concaved surface extending inwardly beyond the same and adapted to embrace a tumbler to resist lateral displacement of the bucket on the tumbler.

3. In bucket chain dredges, the combination of buckets having hubs by which they are pivotally connected in the chain, a tumbler over which the chain of buckets travel, said tumbler having a hub-receiving surface and a bucket-engaging frog formed with a convex outer surface merging with said hub-receiving surface, and a bucket being constructed with a concaved surface forward of and merging with its hub, and with walls at the sides of said concaved surface engaging the sides of the tumbler frog and resisting lateral displacement of the bucket relatively to the tumbler.

4. A bucket for bucket chain dredges, constructed with front and rear pintle hubs and with an under bearing surface forward of and merging into the surface of the rear hub, and formed on an arc coinciding with under surfaces of both said hubs.

5. A bucket for bucket chain dredges, constructed with front and rear pintle hubs and with an under bearing surface forward of and merging into the surface of the rear hub, and formed on an arc coinciding with under surfaces of both said hubs; said bucket also having between said surface and its front hub a recess to receive a driving spur.

6. In bucket chain dredges, a tumbler constructed with driving spurs and with bucket-receiving frogs forward of said driving spurs, formed with convex surfaces merging with said spurs to form saddles for receiving bucket hubs, and buckets constructed with pintle hubs, spaced apart to intermesh with the saddles of the tumbler, and with recesses in rear of their hubs to receive the spurs of the tumbler and with concaved bearing surfaces forward of their hubs to receive the convex surfaces of the frogs on the tumbler.

7. A driving tumbler for bucket chain dredging apparatus, having driving spurs with removable wear plates and supporting brackets therefor.

8. A driving tumbler for bucket chain dredging apparatus, having driving spurs provided with wear plates and having centering frogs on said wear plates.

9. A tumbler for bucket chain dredging apparatus, having a circumferentially extending raised boss or rib providing a bearing surface for a bucket chain, and side faces for engagement by said bucket chain to prevent lateral displacement thereof.

10. A tumbler for bucket chain dredging apparatus, having supporting journals and constructed of a plurality of members divided transversely of the axis of the tumbler, and having a central core upon which said members are mounted.

11. A tumbler for bucket chain dredging apparatus, having supporting journals and constructed of a plurality of members divided transversely of the axis of the tumbler, and having a central core upon which said members are mounted and means drawing said members together upon said core.

12. A tumbler for bucket chain dredging apparatus, having supporting journals and constructed of a plurality of members divided transversely of the axis of the tumbler, and having a central core upon which said members are mounted; said members being shrunk upon said core.

13. A tumbler for bucket chain dredging apparatus, having supporting journals and constructed of a plurality of members divided transversely of the axis of the tumbler, and having a central core upon which said members are mounted, and a tie rod drawing the members of said tumbler together upon said core; said tie rod being under normal stresses of tension.

14. A tumbler for bucket chain dredging apparatus, constructed of a plurality of members divided transversely to the axis of the tumbler, a central core upon which said members are assembled, a central tie rod drawing said members together upon said core, and a series of tie rods located at points radially remote from said central tie rod and also drawing said members together.

15. A tumbler for bucket chain dredging apparatus, constructed with an intermediate circumferentially extending boss; said tumbler being constructed of a central core member and of an intermediate member and two outer members divided transversely of the axis of the tumbler and each resting upon said core; the intermediate member carrying said intermediate boss.

16. A tumbler for bucket chain dredging apparatus, constructed with an intermediate circumferentially extending boss; said tumbler being constructed of a central core member and of an intermediate member and two outer members divided transversely of the axis of the tumbler and each resting upon said core; the intermediate member carrying said intermediate boss; and means being provided for drawing together the two outer members upon said core and against said intermediate member.

Signed at Chicago, Illinois, this 14th day of August, 1922.

WESLEY G. NICHOLS.